United States Patent [19]

Zabsky et al.

[11] 4,185,664
[45] Jan. 29, 1980

[54] LOW NOISE FLUID PRESSURE REDUCER

[75] Inventors: John M. Zabsky, Santa Ana; John R. Marshall, Mission Viejo, both of Calif.

[73] Assignee: Dresser Industries, Inc., Dallas, Tex.

[21] Appl. No.: 896,663

[22] Filed: Apr. 17, 1978

[51] Int. Cl.² .......................................... F16K 47/08
[52] U.S. Cl. .................................. 138/40; 251/126
[58] Field of Search ............... 138/40, 42, 44; 251/126

[56] References Cited

U.S. PATENT DOCUMENTS

| | | | |
|---|---|---|---|
| 1,162,982 | 12/1915 | Crocket | 138/43 |
| 1,459,925 | 6/1923 | Olin | 138/42 |
| 1,917,941 | 7/1933 | Hehr | 138/42 |
| 2,095,635 | 10/1937 | Giffen | 181/47 |
| 2,402,729 | 6/1946 | Buchanan | 138/43 |
| 2,549,360 | 4/1951 | Barbeck | 251/126 |
| 3,251,434 | 5/1966 | Roenick | 181/36 |
| 3,433,264 | 3/1969 | Parkison | 137/625.17 |
| 3,447,566 | 6/1969 | Hayner et al. | 137/489.5 |
| 3,514,074 | 5/1970 | Self | 251/127 |
| 3,630,229 | 12/1971 | Nagel | 137/625.3 |
| 3,631,891 | 1/1972 | Brumm | 137/625.3 |
| 3,665,965 | 5/1972 | Baumann | 138/42 |
| 3,677,300 | 7/1972 | King | 138/42 |
| 3,690,344 | 9/1972 | Brumm | 137/625.28 |
| 3,693,659 | 9/1972 | Parola | 137/625.3 |
| 3,722,854 | 3/1973 | Parola | 138/42 |
| 3,802,537 | 4/1974 | White | 138/42 |
| 3,813,079 | 5/1974 | Baumann et al. | 251/127 |
| 3,880,399 | 4/1975 | Luthe | 251/121 |
| 3,894,716 | 7/1975 | Barb | 138/42 |
| 3,917,222 | 11/1975 | Kay et al. | 138/42 |
| 3,971,411 | 7/1976 | Baumann | 138/43 |
| 4,004,613 | 1/1977 | Purton et al. | 138/42 |

*Primary Examiner*—Steven L. Stephan
*Attorney, Agent, or Firm*—Daniel Rubin

[57] ABSTRACT

Fluid pressure reducing apparatus adapted for positioned placement in a fluid valve or conduit in which pressure reduction is to be effected. A disc, sleeve or other body member in the flow path defines a plurality of line-of-sight grooves of non-circular cross-section between an inlet and an outlet communicating with the upstream and downstream portions, respectively, of the valve or conduit in which it is placed. Contained positioned transverse within each of the grooves are a plurality of longitudinally spaced circular crests formed of screw threads, parallel thin discs or the like. The crests in this arrangement cooperate with the groove walls to define a single stage pressure reducer in a fluid flow path from inlet to outlet through the longitudinal open spacing therebetween.

10 Claims, 15 Drawing Figures

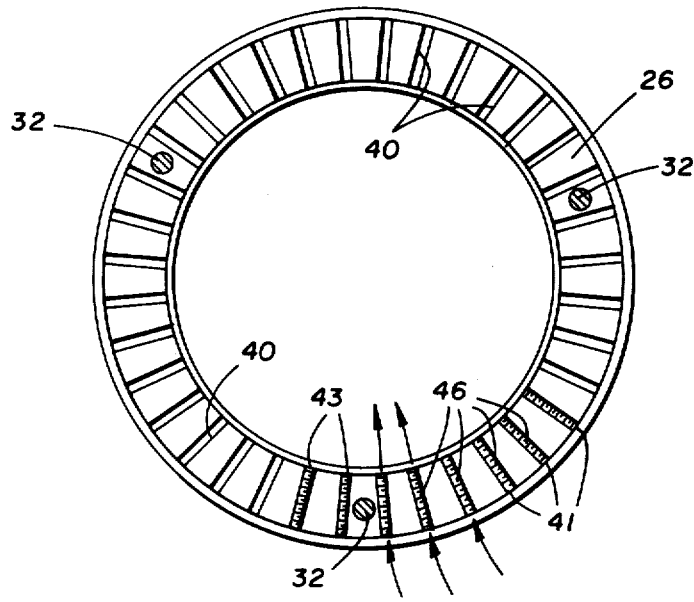
FIG. 4
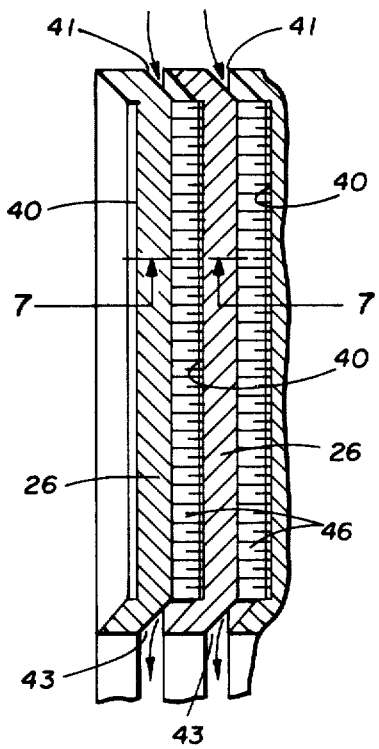
FIG. 5
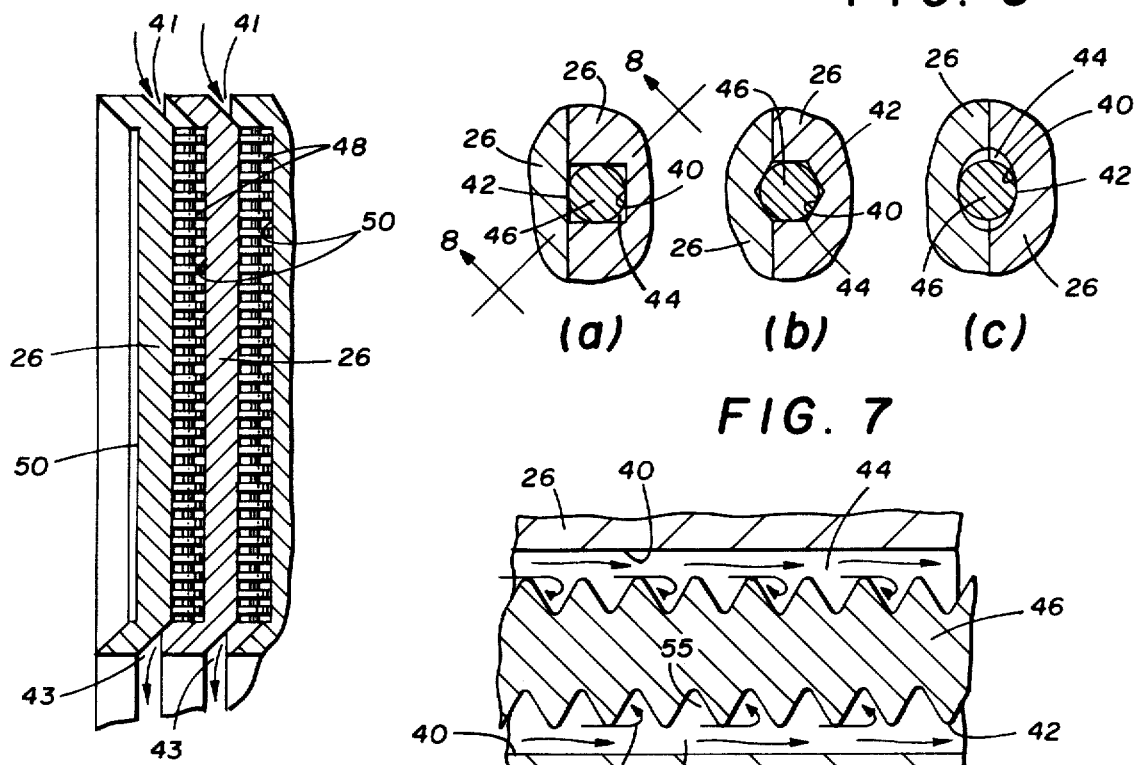
FIG. 6
FIG. 7
FIG. 8

LOW NOISE FLUID PRESSURE REDUCER

BACKGROUND OF THE INVENTION

1. The field of art to which the invention pertains includes the art of pressure reducing fluid flow devices and noise attenuation therefor.

2. For a variety of purposes, it is desirable and/or necessary in fluid transmission systems to effect high pressure drops at some predetermined location in the flow conduit. Typically, the pressure drop is effected by use of a pressure reducing valve or some other commercially available device such as those providing an elongated tortuous flow path of a type disclosed, for example, in U.S. Pat. No. 3,434,500 or a turning pattern as disclosed, for example, in U.S. Pat. No. 3,514,074. In the absence of sound attenuation equipment operably associated with such devices, the attendant noise level with large pressure reductions can reasonably be expected to be on the order of about 120 dbA and above in the course of a 3000 psig. drop. When occurring in a remote or isolated location, noise levels of that magnitude can readily be tolerated, but where occurring in a work area within hearing distance of working personnel, such noise levels can prove to be most annoying and objectionable. Moreover, with the advent of Federal OSHA (Occupational Safety and Hazards Administration) standards, it is now required as a matter of law that noise levels in working areas be maintained at or below 90 dBA when occurring for durations of eight hours per day. This prescribed level is reasonably expected to be reduced at some future date.

Typical prior art for fluid flow pressure reduction with noise attenuation is disclosed, for example, in U.S. Pat. No. 3,447,556. Commercial devices for noise attenuation are likewise available such as the Cavitation Control Trim Mark One and Dragon Tooth valve trim manufactured by Valtek, Inc. of Provo, Utah; Whisper Trim ® and Cavitrol ® valve cages manufactured by Fisher Controls, Marshalltown, Iowa; Lo-dB control valve labyrinth trim manufactured by Masoneilan International, Norwood, Mass.; Self "Drag" valves manufactured by Control Components, Inc., Irvine, Calif., CTV TM and Flash-Flo ® valve trim manufactured by Hammel Dahl/Conoflow Division of ITT of Warwick, R.I.; and Jordan sliding gate valve manufactured by the Jordan Division of Richards Industries, Inc., Cincinnati, Ohio. While these and other commercial units are known to produce varying degrees of generally satisfactory noise attenuation in such fluid reducing systems, their ultimate effectiveness in relation to their premium cost can generally be regarded as somewhat high relative to comparable valves lacking the attenuation feature. Despite recognition of the foregoing, a ready solution able to achieve increased noise attenuation has not heretofore been known.

SUMMARY OF THE INVENTION

This invention relates to pressure reducing apparatus for fluid flow and more specifically to method and apparatus capable of producing greater noise attenuation in fluid flow reducers without employing the elongated tortuous flow paths of the prior art and with a relatively less costly construction than previously known.

This is achieved in accordance herewith by means of a fluid pressure reducer adapted for placement in either a valve, conduit or the like of a fluid flow distribution system. The reducer comprises a housing of usually circular or cylindrical configuration in which is formed a plurality of hydraulically parallel, radial extending line-of-sight grooves or passageways of a predetermined non-circular cross section. Contained in each of the grooves and sized essentially for tangential contact with the passage walls are a series of longitudinally spaced transversely arranged circular crests. The crests cooperate with the passage walls to define corner clearances constituting a longitudinal flow passage therebetween. The crests can comprise, for example, spaced apart parallel plates positioned transversely in the passage or at least laterally to the formed clearance. Alternatively, they can comprise the major diameter crests of an otherwise standard screw thread. Rather than being subjected to helical or angular turns for increasing the flow length in the manner of the prior art, the main flow profile herein is past the crests as to form a single stage pressure reduction from which relatively increased noise attenuation results. By appropriately selecting the number and/or size of passageways, any desired flow capacity for either compressible or incompressible fluids can be readily accommodated.

It is therefore an object of the invention to provide a novel fluid flow pressure reducer for providing increased noise attenuation as compared to similar purpose devices of the prior art.

It is a further object of the invention to provide a pressure reducer as in the previous object affording flexibility of installation for either a valve and/or conduit.

It is a further object of the invention to afford a noise attenuating fluid flow pressure reducer capable of use with either compressible or incompressible fluids for achieving the aforementioned objects in a single stage pressure reduction.

It is a still further object of the invention to effect the foregoing objects with a relatively simple and less costly construction than similar purpose devices of the prior art.

BRIEF DESCRIPTION OF THE DRAWINGS

FIGS. 1a-1b include a plurality of schematic views exemplifying installations in which the reducer hereof can be utilized;

FIG. 4 is a sectional view taken substantially along the lines 4—4 of FIG. 2;

FIG. 5 is an enlarged fragmentary view of the enclosed portion 5 of FIG. 2;

FIG. 6 is a similar view as FIG. 5 for an alternative construction;

FIG. 7 includes alternative sections taken substantially along the lines 7—7 of FIG. 5;

FIG. 8 is an enlarged sectional view taken substantially along the lines 8—8 of FIG. 7(a);

Figure 1:
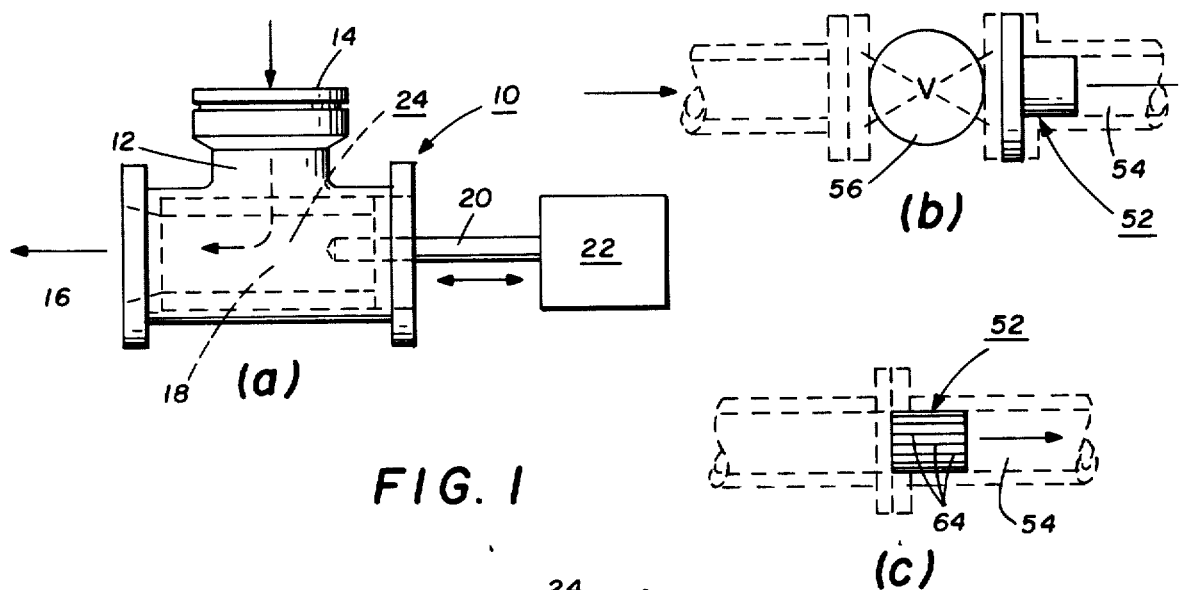
Referring now to FIG. 1, embodiment (a) discloses an angle valve 10 of a type disclosed, for example, in U.S. Pat. No. 4,004,613 that includes a body 12 having a top fluid inlet 14 and a side fluid outlet 16. Operation of the valve for opening, closing or throttling is effected by a plunger cylinder closure element 18 connected via a rod 20 to a suitable operator 22. The pressure reducer in accordance herewith comprises a tubular sleeve-like member 24, as will be described below, internally accommodating slideably positioned setting of the valve plunger 18.
Figure 2:
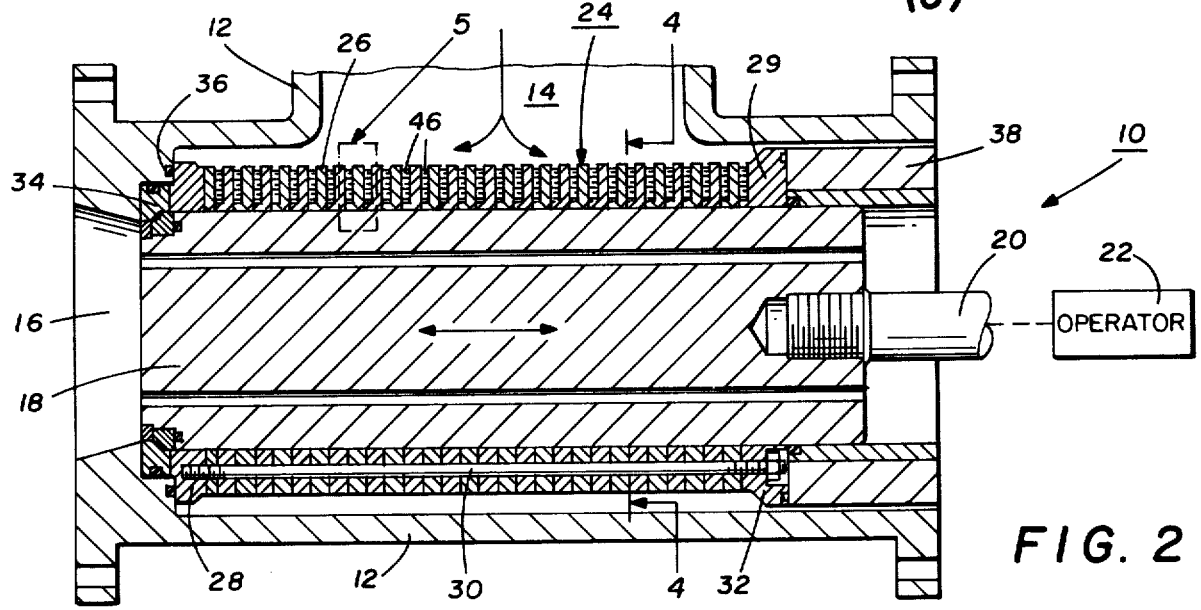
FIG. 2 is a transverse section through a closed valve as exemplified by FIG. 1(a)
Figure 3:
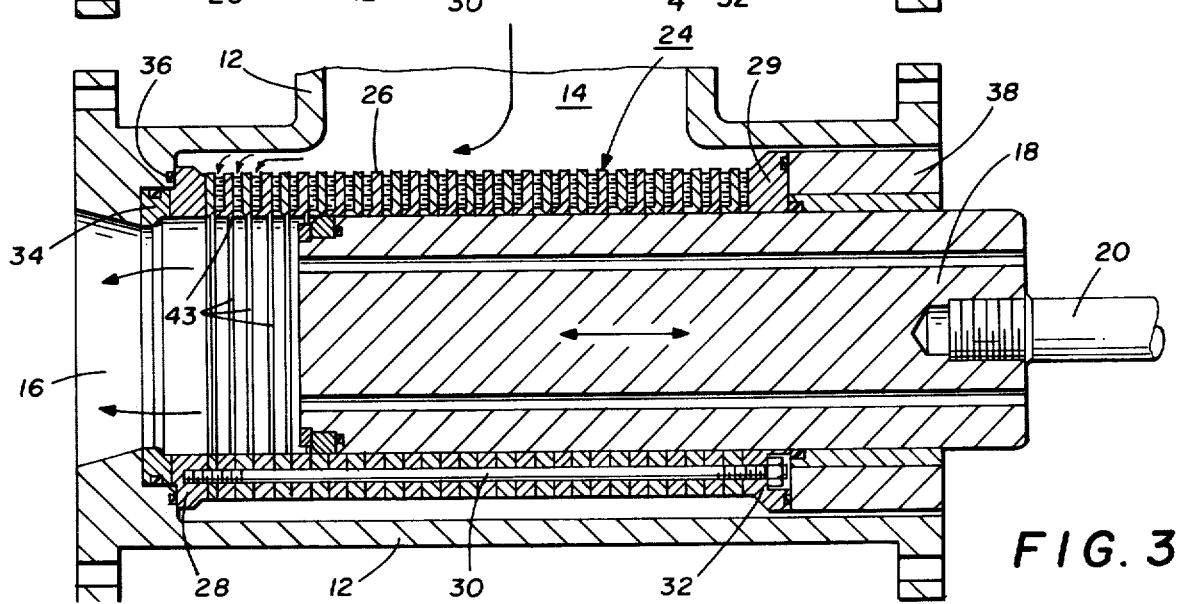
FIG. 3 is a transverse section similar to FIG. 2 of the valve in its partially open position.

Reducer 24 for this embodiment can best be understood by also referring to FIGS. 2-7, in which it can be seen that the sleeve-like reducer construction is formed by a plurality of axially nesting annular rings 26. The rings in turn are secured in a tubular formation by a pair of end plates 28 and 29 secured via bolts 30 extending through aligned apertures 32. The reducer unit when fully pre-assembled is placed positioned in the valve passage between inlet 14 and outlet 16 until interfitting with seat ring 34 and body shoulder 36 thereat. The reducer is secured in this relation by means of tubular bushing 38.

Radially contained uniformly spaced about the face of each ring 26 are a plurality of radial grooves or passages 40 extending between an inlet 41 and an outlet 43. Each groove is of non-circular transverse section and cooperates with the contiguous ring to form an enclosed passage as typically represented by the illustrations of FIGS. 7(a), (b) and (c). Grooves 40 are preferably of square section, as illustrated in FIG. 7(a) in which the illustrated rightward nesting ring 26 for each groove encloses the longitudinal portion of the passage between the inlet and outlet. In alternative FIGS. 7(b) and (c) the rightward nesting ring includes a complementary portion of groove 40 for completing the selected non-circular cross-sectional geometry.

Longitudinally positioned inserted in each of grooves 40 so as to preferably make tangential contact with the enclosing walls thereof are a series of transversely arranged, longitudinally spaced apart circular crests 42. As shown in FIG. 5, the crests can comprise the major diameter of an elongated screw member 46 or as shown in FIG. 6 can comprise a plurality of longitudinally spaced transverse discs or plates 48 secured on a central rod 50. These crests per se, as best seen in FIG. 7, cooperate with the walls of groove 40 to define intervening corner clearances 44 extending longitudinally therebetween. In either arrangement, the main profile for fluid flow extends through the clearances 44 in contact with crests 42 and for which any suitable difference in cross-sectional geometrics can be utilized between grooves 40 and insert crest 42 for defining any number of long length clearances 44 therebetween. The flow profile can be best seen in FIG. 8 in which arrows 51 represent vortice generation that occurs in the valleys 55 between adjacent crests 42 and believed to contribute to the results hereof.

For the alternative embodiment of FIG. 1(b) the pressure reducer is designated 52 and is adapted for positioned placement in a pipeline 54 contiguously downstream of a plug-and-cage-type control valve 56. Details concerning alternative embodiment 52 can most clearly be seen in FIGS. 9 and 10 in which reducer 52 is a more or less T-shaped ring-like disc 53 having an outer flange 58 adapted for installation between a valve flange 60 and a pipe flange 62. The main body of the reducer includes a centrally outer portion in which are formed a plurality of radial slots or grooves 64 located equiangularly spaced thereabout. Each of the slots extends from an inlet 65 at its outer periphery to an inward termination at an outlet 69. Flow from all the outlets merge into a centrally open counterbored cavity 66 which in turn opens into a common flow passage 70 of tubular neck 68 extending into downstream piping 54. Coextensively superposed over the front face of disc body 54 and secured thereat by means of screws 72 is an annular cover plate 74. The periphery of plate 74 in this relationship cooperates with the inside face of L-sectioned annular flange 58 to form an intervening annular inlet flow passage 76 communicating flow from the outlet of valve 56 to the inlet 65 of slot 64. Each of slots 64 provides a line-of-sight flow and similarly as above are of a non-circular cross section.

Contained in each of the slots or grooves 64 is either a screw 46 or a plurality of disc plates 48 providing a flow clearance 44 past crests 42 formed thereby as above. For this embodiment, retention pins 78 and 80 are placed at the inlet and outlet ends, respectively, of groove 64 in order to preclude inadvertent forced release of screw 46 intended to be retained therein. Alternatively, reducer 52 can be placed in isolated relation in a pipeline 54 apart from any valve as shown in FIG. 1(c), although preferably for that application the reducer would be cylindrical and include grooves and inserts with their longitudinal axis extending parallel to the direction of flow.

Figure 9:
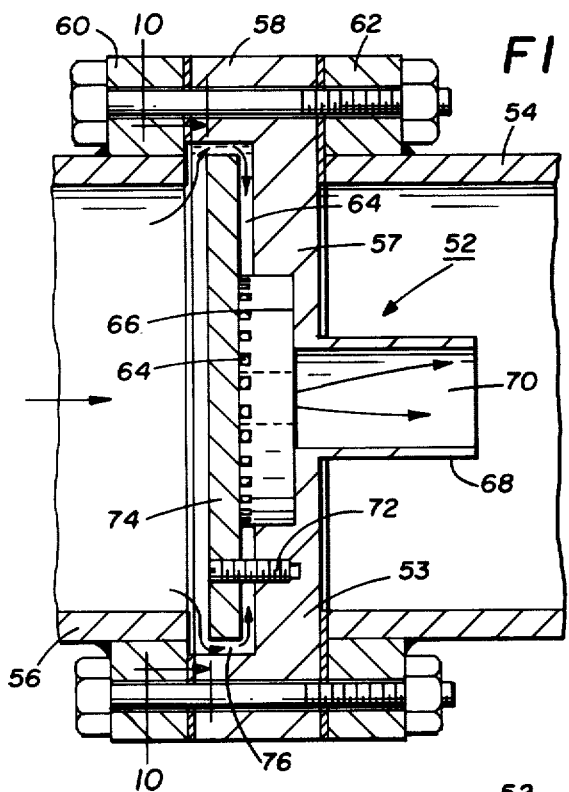
FIG. 9 is a sectional elevation view of the reducer hereof as utilized for incompressible flow in the embodiments of FIGS. 1(b) and 1(c)
Figure 10:
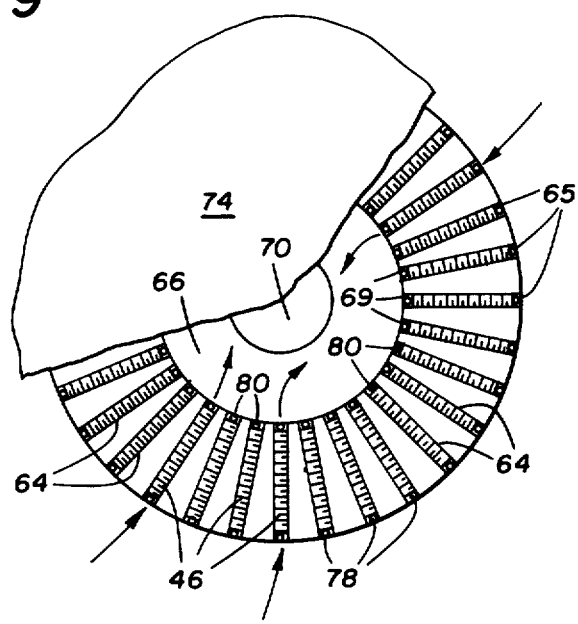
FIG. 10 is a front elevation view as seen substantially along the lines 10—10 of FIG. 9.
Figure 11:
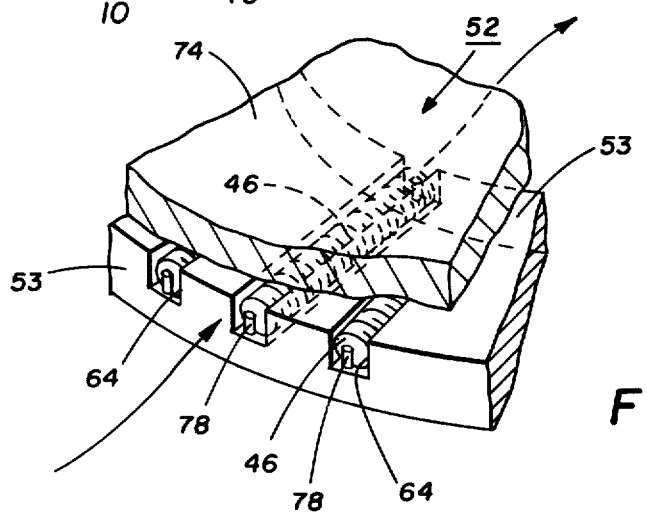
FIG. 11 is a fragmentary isometric of the FIG. 9 embodiment illustrating the flow pattern for an incompressible fluid.
Figure 12:
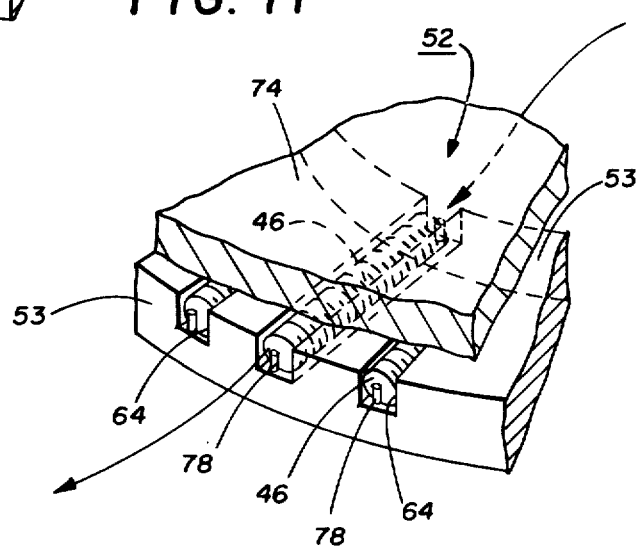
FIG. 12 is a view similar to FIG. 11 illustrating the flow pattern for a compressible fluid.
Figure 13:
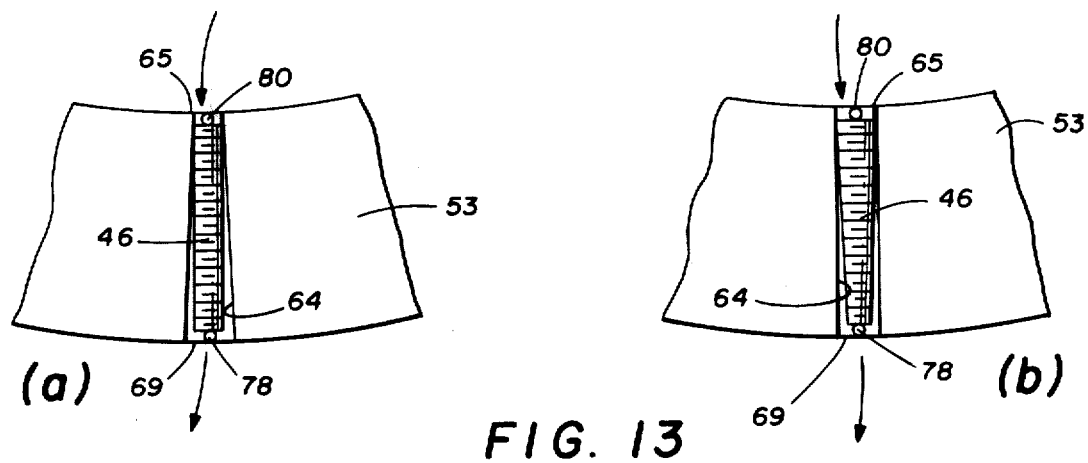
FIG. 13 includes alternative fragmentary views representing variations of the FIG. 12 embodiment for obtaining flow expansion of a compressible fluid.

As illustrated in FIG. 11, the directional flow pattern is consistent with the embodiment of FIG. 9 adapted for incompressible liquid flow, it being understood that for flow of a compressible fluid the directional pattern would be reversed end for end in the manner illustrated in FIG. 12. Where flow expansion is desired or necessary for a compressible fluid such as air, natural gas, steam, etc., reducer 52 can be modified in the manner of FIGS. 13(a) or 13(b) affording a relatively tapered enlargement of the flow clearance from inlet 65 to outlet 69 between the crests 42 of screw 46 and the walls of slot 64. As shown in FIG. 13(a) a straight screw 46 is employed in a tapered slot 64 whereas in FIG. 13(b) a straight slot 64 is employed in combination with a tapered screw 46. In either arrangement, expansion of the fluid reduces its velocity at the exit plane further contributing to its noise attenuation.

Figure 14:
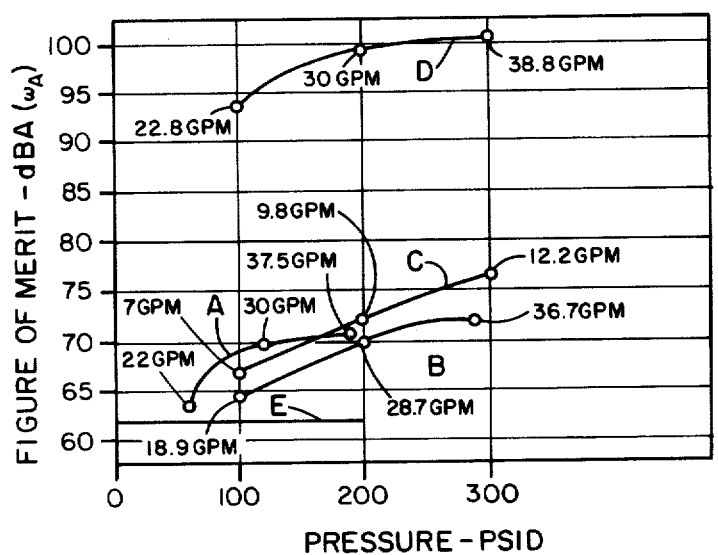
FIGS. 14 and 15 are graphical representations of performance data of the reducer hereof as compared to similar purpose devices of the prior art for incompressible and compressible fluids, respectively.

Performance results obtained with these embodiments for incompressible liquid flow are graphically represented in FIG. 14. As there shown, curves A and B represent performance in accordance with the devices hereof utilizing $\frac{1}{8}$ inch square grooves 64 containing screws 46 of 40 pitch and 55 pitch, respectively. Curve C represents performance of an attenuation unit manufactured by Control Components, Inc., supra, while curve D represents an equivalent area orifice. Straight line E represents background noise detected by test equipment under a no-flow condition. The "figure-of-merit" value represented by the ordinate axis is not a direct sound measurement but, rather, is a comparative result correlated to sound measurement and derived by the following equation:

$$\omega_A = dBA - 10 \log_{10} C_v$$

where
dBA = measured sound level
$C_v$ = flow coefficient for a measured flow and pressure drop The tested unit represented by curve C was a plug-and-cage type referred to by the manufacturer as the Self "Drag" Valve. Operation is dependent on a tortuous mazed flow path in which the multistage turns successively reduce fluid velocity and accompanying noise level. While the effective flow areas for all the units were closely comparable, the reduced flow indicated for the unit of curve C can be attributed to the multistage characteristics of its flow paths. More specifically, the unit of curve C had a total flow area of 0.096 square inches while the units for each of the curves A and B included thirty grooves 64, each with four corner clearances 44 giving a total flow area of 0.100 square inches. The single hole orifice of curve D likewise had a flow area of 0.100 square inches.

What can be readily deduced from the graphical information of FIG. 14 is that for like pressure drop the units of curves A and B enable significantly greater flow capacity at slightly greater reductions of noise level. Stated otherwise, the units of curves A and B produce a significantly lower figure of merit at a significantly lower pressure drop than the unit of curve C at comparable flow rates.

Figure 15:
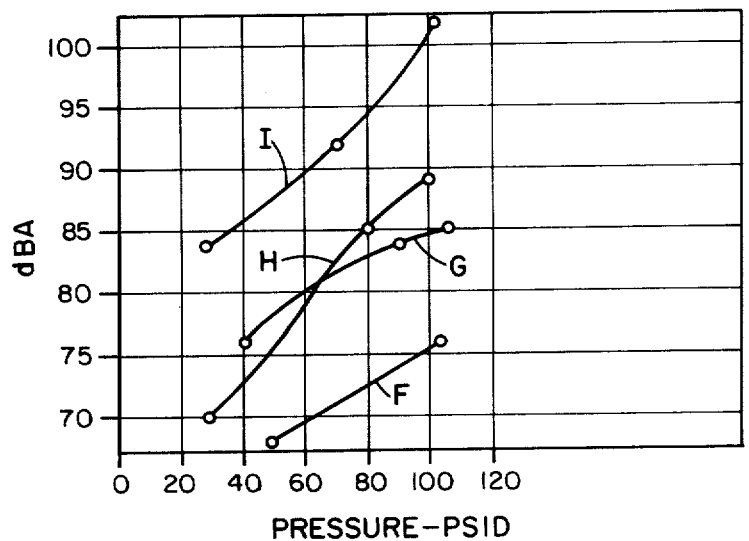

FIG. 15, contrast with FIG. 14, is a graphical representation for a compressible fluid such as air. Here, curve F was obtained with a unit in accordance herewith using a square cross section groove 64 containing a screw thread 46 of 55 pitch. Curves G and H represent scaled down versions of equipment mentioned supra as manufactured by Fisher and Masoneilan, respectively. Curve I represents an equivalent area single hole orifice. The ordinate axis in this graph represents a direct sound measurement rather than the figure of merit as used above. Clearly apparent is that for a like pressure drop on the order of 50 psig. roughly occurring in the range of about 50 to 100 psig., the noise level elevates from on the order of 69 to on the order of 76 dBA for the unit hereof and which is significantly less than either the commercial equipment or equivalent area orifice represented by curves G, H and I.

With the foregoing arrangements, any number of slots 64 can, of course, be selected to accommodate anticipated flow quantities and in general it has been found that on the order of about one slot 64 is required per gallon per minute or anticipated flow rate. On the basis of screw length, as between for example one-half inch and one inch, the difference in performance has been found almost inperceptible. For practical purposes it is preferred that screw length should be at least one-half inch although one inch has proved most convenient for purposes of fabrication. Likewise as seen in FIG. 14, some performance differential can be detected as a function of thread pitch, with the higher pitch providing less attenuation at a given flow.

By the above description there has been disclosed a novel low noise fluid pressure reducer capable of achieving greater noise attenuation at given pressure drops than comparable purpose devices of the prior art. By a relatively simple construction in which flow is caused to pass in a line-of-sight non-circular passage past a plurality of circular crests confined longitudinally spaced within the passage, a highly unexpected result is achieved with a relatively simple construction mechanism.

Whereas the invention has principally been described in the preferred mode using crests of circular cross section transversely confined in longitudinal grooves of polygonal cross section, it is not intended to be so limited. Rather, it should be apparent that the invention would include any differences in cross section by which adequately close clearance will be defined, even including square crests in a circular groove.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. A fluid pressure reducer comprising in combination:
   (a) body means adapted for position placement in a fluid flow conduit;
   (b) at least one substantially line-of-sight opening of a predetermined cross sectional geometry extending through said body means between an inlet and outlet for communicating with flow conduit thereat; and
   (c) a plurality of crest means contained in a generally transverse orientation longitudinally spaced apart in confining enclosed relation within said opening, said crest means being of a peripheral configuration in transverse section different than the geometrical surface configuration of said opening for cooperating with the opening walls thereat to define at least one longitudinal line-of-sight clearance space intervening therebetween and constituting a passage in which fluid flow can be conducted through said body means.

2. A pressure reducer according to claim 1 in which said line-of-sight longitudinal clearance is defined in a flow path between peripheral portions of said crest means and the opposite interior wall face of said opening wall.

3. A pressure reducer according to claim 2 in which the cooperating configurations of said crest means and opening effectively. define a plurality of individual line-of-sight flow passages therebetween.

4. A pressure reducer according to claim 3 in which said body means includes a plurality of said substantially line-of-sight openings and said crest means is contained in each of said openings for providing parallel flow passages through said body means.

5. A pressure reducer according to claims 1, 2, 3 or 4 in which said predetermined cross sectional geometry of said opening is substantially polygonal.

6. A pressure reducer according to claim 5 in which said peripheral configuration of said crest means in transverse section is substantially circular.

7. A pressure reducer according to claim 6 in which said crest means comprise a plurality of parallel plate members longitudinally spaced apart and arranged transversely extending in their contained opening.

8. A pressure reducer according to claim 6 in which said crest means comprise the major diameter thread crests of a threaded insert in its contained opening.

9. A pressure reducer according to claims 1, 2, 3 or 4 in which said plurality of crest means in said opening has a longitudinal extent of at least one-half inch.

10. A pressure reducer according to claim 6 in which said plurality of crest means in said opening has a longitudinal extent of at least one-half inch.

* * * * *